United States Patent [19]

Alten

[11] Patent Number: 4,495,737
[45] Date of Patent: Jan. 29, 1985

[54] DEFORMABLE SEAL OF THE GAP BETWEEN A BUILDING OPENING AND A VEHICLE DRIVEN UP TO IT

[76] Inventor: Kurt Alten, Ringstr. 14, D-3015 Wennigsen, Fed. Rep. of Germany

[21] Appl. No.: 403,580

[22] Filed: Jul. 30, 1982

[30] Foreign Application Priority Data

Aug. 3, 1981 [DE] Fed. Rep. of Germany ....... 3130657
Jan. 25, 1982 [DE] Fed. Rep. of Germany ....... 3202252

[51] Int. Cl.³ .................... E04H 14/00; E01D 1/00
[52] U.S. Cl. ............................... 52/173 DS; 14/71.5
[58] Field of Search ............. 52/173 DS; 49/475, 504; 14/71.5

[56] References Cited

U.S. PATENT DOCUMENTS

| | | | |
|---|---|---|---|
| 1,614,731 | 1/1927 | Godley | 49/475 |
| 3,484,883 | 12/1969 | Van Marle | 52/173 |
| 3,693,204 | 9/1972 | Eggert, Jr. | 14/71.5 |
| 3,703,737 | 11/1972 | Eggert, Jr. | 14/71.5 |
| 4,070,801 | 1/1978 | O'Neal | 52/173 DS |
| 4,120,067 | 10/1978 | Hone et al. | 52/173 DS |
| 4,148,953 | 4/1979 | Horton | 49/475 |
| 4,389,821 | 6/1983 | O'Neal | 52/173 DS |

FOREIGN PATENT DOCUMENTS 2717146 11/1978 Fed. Rep. of Germany ... 52/173 DS

Primary Examiner—John E. Murtagh
Assistant Examiner—Andrew Joseph Rudy
Attorney, Agent, or Firm—Becker & Becker

[57] ABSTRACT

A deformable seal of the gap between the edge of a building opening and the back end of a vehicle such as a truck or semi-trailer truck driven up to the building opening. The seal has an apron which at the sides and at the top is fastened to a rigid, downwardly opened U-shaped frame which is spaced from the building. The frame is held by inclined guides which are unchangeable in height at that end thereof facing the building. A flexible covering is provided on both sides as well as at the upper edge of the apron. One edge of this covering is fastened to the frame, and the other edge is fastened to the building. That edge of the covering facing the building is guided in such a way as to be adjustable in height. A tension spring may be provided which is effective on the guides and/or the U-shaped frame in such a manner that the edges of the covering are adjustable upwardly only counter to the effect of this tension spring.

5 Claims, 4 Drawing Figures

DEFORMABLE SEAL OF THE GAP BETWEEN A BUILDING OPENING AND A VEHICLE DRIVEN UP TO IT

The present invention relates to a deformable seal of the gap between the edge of a building opening and the back end of a vehicle driven up to it. The seal has an apron which at the sides and at the top is fastened to a rigid, downwardly open U-shaped frame which is spaced from the building; the frame is held by inclined links or guides which are unchangeable in height at that end thereof facing the building; a flexible covering is provided on both sides as well as at the upper edge of the apron, and one edge of this covering is fastened to the frame, while the other edge is fastened to the building.

The aforementioned links or guides are intended to make possible a deflection of the frame when the apron is deformed by a vehicle driven to the building opening. If the length of the guides cannot be varied, or other additional measures are not undertaken, the frame is lifted slightly with the apron, while the laterally arranged coverings are greatly deformed or distorted. These distortions and deformations can lead to a premature failure of the coverings.

It is an object of the present invention to improve the aforementioned seals in such a manner that special measures at the guides, and the kinematic arrangement of the suspension of the frame, are eliminated, and angular stressing of the covering cannot lead to the aforementioned damages.

It is another object of the present invention to improve the aforementioned seals in such a way that a rapid return of the mentioned edges of the covering occurs, while at the same time increasing the deformation resistance of the apron located at the front of the seal, whereby all deformable and movable parts located at the front of the seal are slower to respond when the seal is contacted by a vehicle.

These and other objects and advantages of the present invention will appear more clearly from the following specification in connection with the accompanying drawings, in which.

Figure 1:
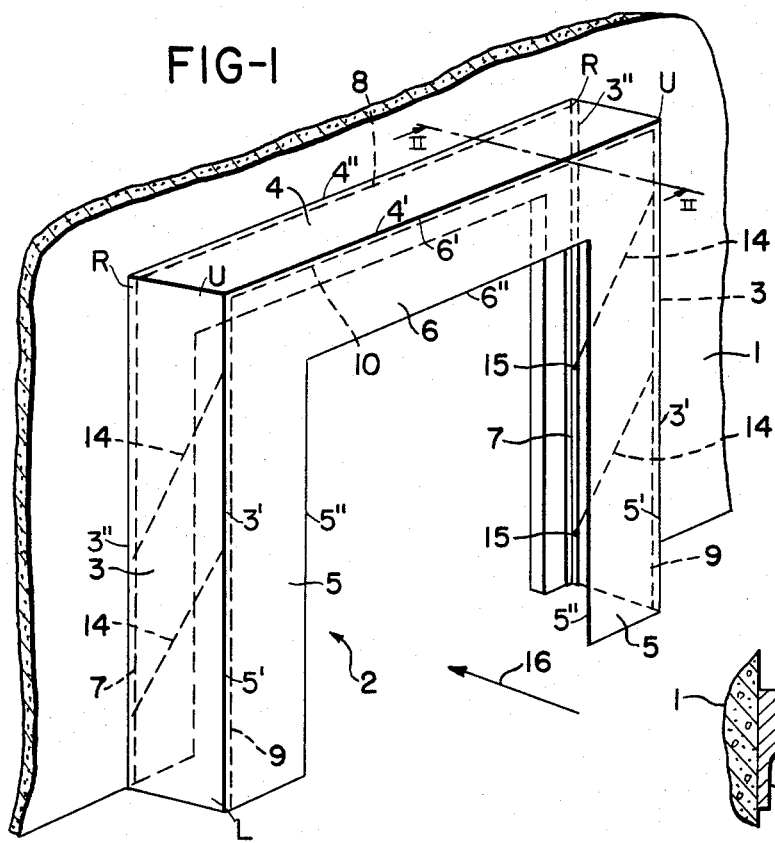
FIG. 1 is a perspective view showing one inventive embodiment of a seal at the edge of an opening of a building.

The seal of the present invention is characterized primarily therein that edge of the covering located on both sides of the apron, which edge faces the building, is guided in such a way as to be adjustable in height. This height adjustment can expediently be effected via a shiftable mounting of the edges in a vertical groove which may advantageously also be undercut in order to achieve a positive connection. The edges may be folded over and may surround a rod-like core disposed in the groove.

The thus mounted edges make possible a shifting which can adjust itself in conformity with the angular loading of the covering. It is, of course, possible, for instance by fixing the upper end, to prevent an undesired departure of the edge from the mentioned grooves by slipping or sliding. If, for instance, the mentioned edge is arranged rigidly, i.e. not shiftable, on the building, in the region of its upper end, the shifting can still occur to a sufficient extent by a movement in the lower segment of the covering.

This height adjustment can occur counter to the effect of a returning or restoring force, for instance counter to the action of a tension spring. Usually, however, the weight of the covering is already sufficient to permit a lowering of the edges when the distortion or the like of the covering is no longer effective.

Also the lower end of the edge of the covering facing the U-shaped frame may be shiftably mounted in the sense of the opposite edge. The edge facing the frame may be rigidly connected with the frame only at the upper end thereof.

The seal of the present invention may also be provided with a tension spring which is effective on the guides and/or the U-shaped frame in such a manner that the edges of the covering are adjustable upwardly only against the effect of the tension spring. Preferably, a tension spring is utilized which, possibly in connection with a cable, is effective in or essentially effective in the diagonal direction of a parallelogram which is formed by the outer side of the building, by the U-shaped frame, and by the two links or guides which are parallel to each other.

As a result of this tension spring, a notable deformation of the apron must first occur, or a correspondingly strong mechanical stressing of the U-shaped frame must first occur, before the frame moves to a notable extent by pivoting of the guides in the direction toward the building. If this stressing is discontinued, i.e. the vehicle leaves the building, the guides are pivoted back or the U-shaped frame moves forward. At the same time the edge of the lateral covering also lowers. This spring accordingly indirectly effects a return of the mentioned edges; at the same time, a sufficient deformation of the apron can occur, thereby providing a good seal relative to the vehicle.

The ends of the tension spring, and of a load or extension cable possibly connected therewith, may be fastened at those locations at which the link or guide ends are fastened. A pair of guides may be provided on each side of the seal.

Referring now to the drawings in detail, the building 1, for instance a warehouse, has an opening 2 up to which the back end of vehicles can be driven for loading and unloading purposes. A vertically extending covering 3 having first and second edges 3', 3" is located on both sides of this opening 2, and a horizontally extending transverse covering 4 having first and second edges 4', 4" is located thereabove. These coverings 3 and 4 establish a connection from the building 1 to an apron which has a vertical segment 5 on both sides of the opening 2, and a horizontal segment 6.

These parts of the seal (3, 4, 5 and 6) are made of a water-tight flexible foil, a rubberized fabric, or the like.

The opening 2 is enclosed by a U-shaped frame which is formed by a pair of vertical or upright legs 7 and an upper crosspiece 8. These metallic profiled members are rigidly connected with the building 1 and serve for fastening the first and second edges 3', 3" of the covering 3 and the edges 4', 4" of the transverse covering 4. Those edges 3' and 4' of the coverings 3, 4 remote from the building 1 are rigidly connected with a further inverted U-shaped frame which comprises a pair of vertical or upright metallic profiled members 9, and an upper transverse horizontal profiled member 10.

Longitudinal grooves 11, which are rounded and slightly undercut, are located in the essentially angular profiled members 7, 9. The longitudinal grooves 11 serve for receiving the doubled or folded over first edges 3' of the covering 3. A removable rod-like core 12 is provided for increasing the thickness so that this covering 3 cannot be pulled from the longitudinal grooves 11 by horizontal pulling or tension forces. The apron 5, 6 in turn engages in narrow grooves 13 of the profiled member 9, where it is clamped or riveted into position in order to preclude the segments of the apron 5, 6 from sliding or slipping-out.

Two inclined upwardly directed guides 14 are connected to the building 1 or the profiled members 7, via the joints 15, on each side of the opening 2. These guides or links 14 support the downwardly open or inverted. U-shaped frame, comprising the profiled members 9, 10, 9 and thus all parts of the seal which are connected with these profiled members. The coverings 3, 4 are hereby made taut or stretched, in fact solely because of the weight of the profiled members 9, 10, 9 and the elements connected therewith.

The covering 3, 4 is a weather protection to the side and toward the top. The apron 5, 6 forms the actual seal and includes second edges 5'', 6'' directed inwardly for effecting sealing with respect to a vehicle; it deforms in a sealing manner when its segments are struck or contacted by a non-illustrated vehicle, such as a truck.

During a deformation of the apron, there cannot be avoided that pressure is exerted in the direction of arrow 16 upon the, inverted U-shaped frame 9, 10 and 9 respectively in FIG. 1. This causes a deflection of the guides or links 14 in the direction of the arrow 17 accompanied by a lifting of the inverted U-shaped frame 9, 10, 9 and a corresponding distortion or deformation of the covering 3.

Figure 3:
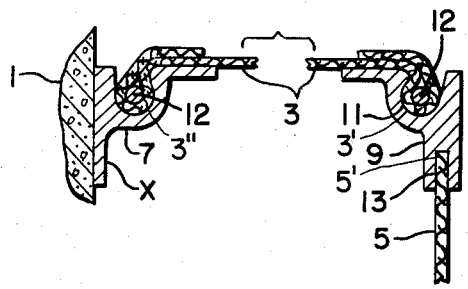
FIG. 3 is a fragmentary sectional view taken along line III—III in FIG. 2.
Figure 2:
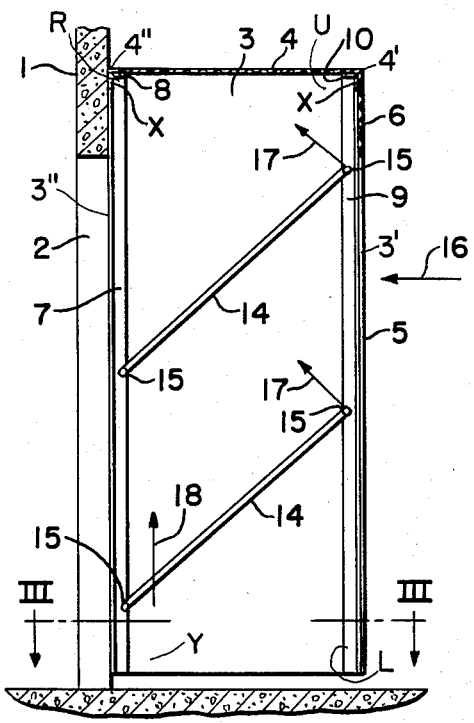
FIG. 2 is a section taken along line II—II in FIG. 1.

As shown in FIG. 3, that edge of the covering 3 fastened to the profiled member 9 has an upper end U that is rigidly clamped in; that edge facing the building on the other hand has a lower end L that is arranged in the groove 11 in such a way as to be shiftable and adjustable in height at Y. Thus, a distortion or deformation in the foregoing sense can be countered in that the covering 3 slips or slides more or less upwardly in conformity with the distortion or deformation, namely in the direction of arrow 18. So that, however, a lowering of the covering 3 cannot occur, the latter is rigidly clamped in an upper region R of the second edge 3'' of the coverng that is fixed to prevent displacement thereof, or securely arranged in another manner, at X.

The edge facing the building is only fixed at the top while therebelow it hangs downwardly freely shiftable solely because of its own weight, thereby also becoming taut to a sufficient extent. However, for lighter coverings 3 a tension spring can be provided at the lower edge of this covering. This tension spring always returns the covering 3 back to the position illustrated when the deformation or the adjustment in height of the front U-shaped frame 9, 10 no longer is encountered. The lower segment or end L of the front or first edge of the covering 3 can also be shiftable and adjustable in height. Normally, however, a shiftable mounting of the rear edge of the covering 3, i.e. that edge facing the building, is sufficient.

Although the shifting or sliding capability of this edge has the aforementioned advantage, this shifting capability can lead to deformation of the apron 5, 6 already when small forces act on the apron, without the apron at the same time experiencing a deformation which is expedient for a good sealing effect to fit closely to the vehicle.

Figure 4:
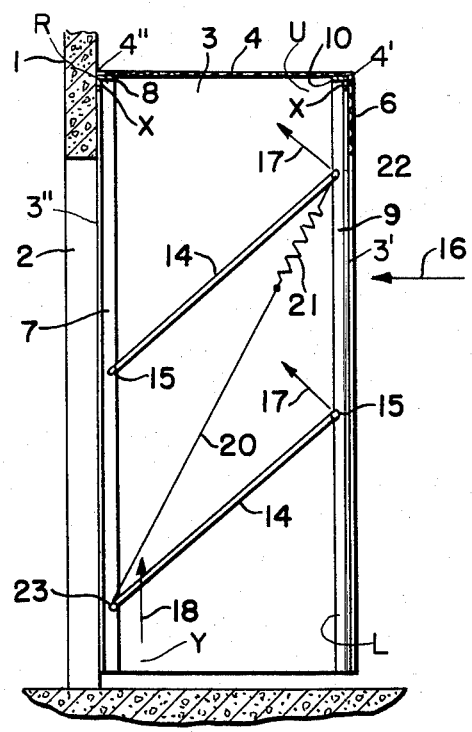
FIG. 4 is a view similar to that of FIG. 2 of a modified embodiment of the inventive seal.

To retain the advantages of shifting or sliding, and yet to increase the sealing effect, a tension spring 21 connected with a load cable 20 is provided (FIG. 4). The tension spring 21 engages the profiled member 9 at the joint 22 of the upper link or guide 14, while at the lower end the load cable 20 engages at the joint 23 at which the lower end of the lower link or guide 14 is pivotally connected with the profiled member 7.

Accordingly, the tension spring 21 and the load cable 20 extend in the diagonal of a parallelogram which is determined by the two guides 14 and the two profiled members 7 and 9. When the apron is stressed, the tension spring 21 counters a pivoting of the guide 14 in the direction of the arrow 17. This resistance of the tension spring 21 has as a consequence that the apron first experiences a deformation sufficient for attaining a seal before movement of the apron can occur in the direction of the arrow 16, with which then shifting of the edge of the covering 3 facing the building 1 can occur. The tension spring 21 furthermore assumes the task of returning the apron to the rest position, which also applies to the aforementioned edge. To this extent the tension spring 21 fulfills a dual function.

The present invention is, of course, in no way restricted to the specific disclosure of the specification and drawings, but also encompasses any modifications within the scope of the appended claims.

What is claimed is:

1. A deformable seal for a gap between the edges of an opening of a building and a back end of a vehicle driven up to a location adjoining said opening, said seal in combination therewith comprising:

a rigid inverted U-shaped frame which is spaced from the building, said frame having a U-shape open at the bottom;

two inclined parallel guides each having a first end connected to said frame and a second end which is operatively connected to the building and which is unchangeable in height thereof at the second end thereof where said guides connected to the building are also rigidly fixed to the frame;

an apron having a first outer edge fastened to said frame and having a second edge thereof directed inwardly for effecting sealing with the vehicle; and a resilient yieldable covering located between said apron and the building as well as being provided along two sides thereof as well as along the upper edge of the apron, which covering is fastened with one edge thereof secured to said frame and with the other second edge thereof being fastened to the building, the edge toward the building of said covering being fixed only at an upper edge thereof and in a remaining range thereof, however, being guided in a height adjustable manner and, furthermore, said rigid guides being provided therewith; a tension apring intregrally connected to a cable forming a first end and a second end, said tension spring and cable extending between the two parallel guides, the first end of said spring and cable being secured to the first end of one of the guides at said frame, the second end of said spring and cable being secured to the other guide, said other guide being adjacent to and connected to the building.

2. A seal according to claim 1, which includes members connected to said building, said members and said frame being respectively provided with a vertical groove, at least a portion of said first and second edges of said covering being arranged in said grooves, said grooves being undercut.

3. A seal according to claim 1, in which said second edge of said covering is adapted to return to a non-stressed starting position, after termination of an upward displacement thereof, under the weight of said covering.

4. A seal according to claim 2, in which a rod-like core is disposed in each groove, and in which those portions of said first and second edges of said covering arranged in said grooves are folded over and surround said core.

5. A seal according to claim 1 wherein said tension spring is essentially effective particularly only in the direction of a diagonal of a parallelogram, two of the opposite sides of which are formed by the guides of a pair of guides and including a pair of guides associated with each leg of said frame having the U-shape open at the bottom.

* * * * *